No. 852,615. PATENTED MAY 7, 1907.
H. O. PUTT.
SOUND WAVE INTENSIFIER.
APPLICATION FILED OCT. 3, 1906.

2 SHEETS—SHEET 1.

Harlie O. Putt,
INVENTOR

WITNESSES:

By C. A. Snow & Co.
ATTORNEYS

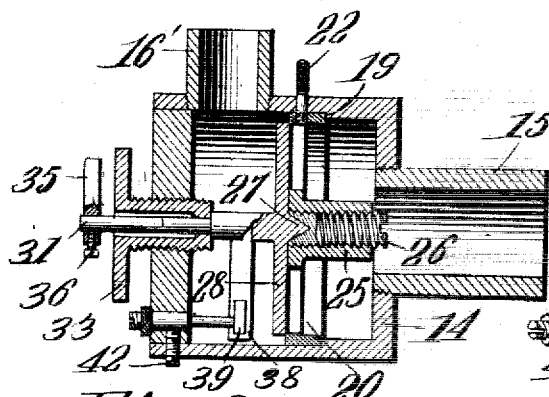
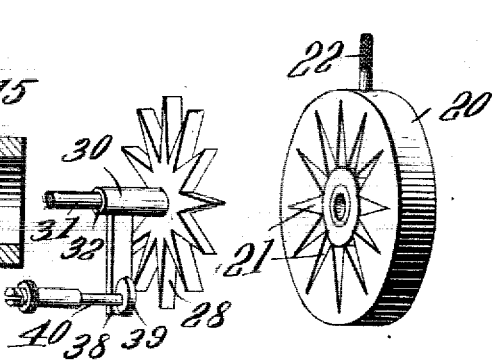
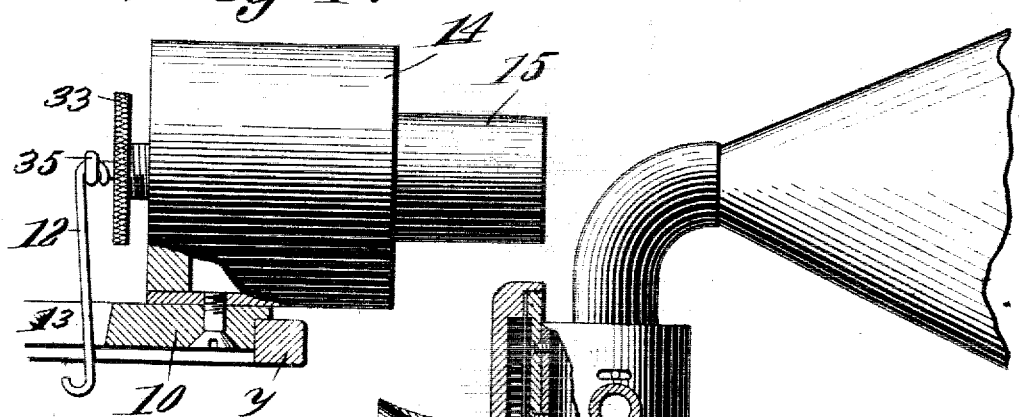
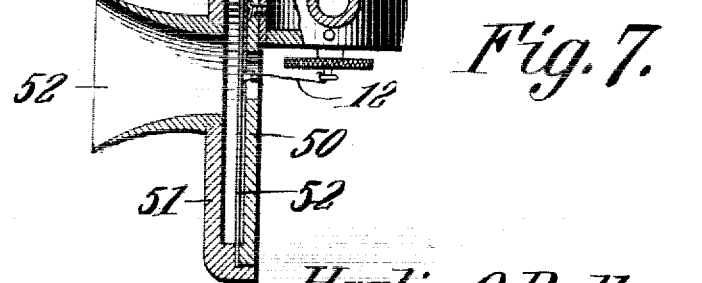

UNITED STATES PATENT OFFICE.

HARLIE OGDEN PUTT, OF MILLBURY, OHIO.

SOUND-WAVE INTENSIFIER.

No. 852,515.　　　Specification of Letters Patent.　　　Patented May 7, 1907.

Application filed October 3, 1906. Serial No. 337,272.

*To all whom it may concern:*

Be it known that I, HARLIE OGDEN PUTT, a citizen of the United States, residing at Millbury, in the county of Wood and State of Ohio, have invented a new and useful Sound-Wave Intensifier, of which the following is a specification.

This invention relates to sound reproducing apparatus, and has for its principal object to provide means whereby comparatively weak sound waves may be magnified, the invention being applicable to sound reproducing machines of the phonograph, graphophone or gramophone type, as well as to different forms of sound transmitting devices, such, for instance, of megaphones, speaking trumpets and the like.

A further object of the invention is to provide a mechanism whereby the comparatively feeble vibratory movement of a reproducing stylus or diaphragm may be employed to control the flow of a fluid under pressure in such manner that the fluid will follow precisely the movements of the stylus or diaphragm and produce sound waves of much greater intensity than would be possible where the reproducing means acts directly on atmospheric air at normal pressure.

A still further object of the invention is to provide a mechanism in which the flow of a body of fluid under pressure is controlled through the action of a sound wave record or directly by a diaphragm or other body receiving motion from sound waves.

A still further object of the invention is to provide a sound wave magnifying apparatus in which numerous short blasts of a fluid under pressure may be directed against the atmospheric air, the duration and intensity of the blast being under the control of the reproducing stylus of a phonograph or like machine, or under the control of a diaphragm or other body that is operated by sound waves.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 1:
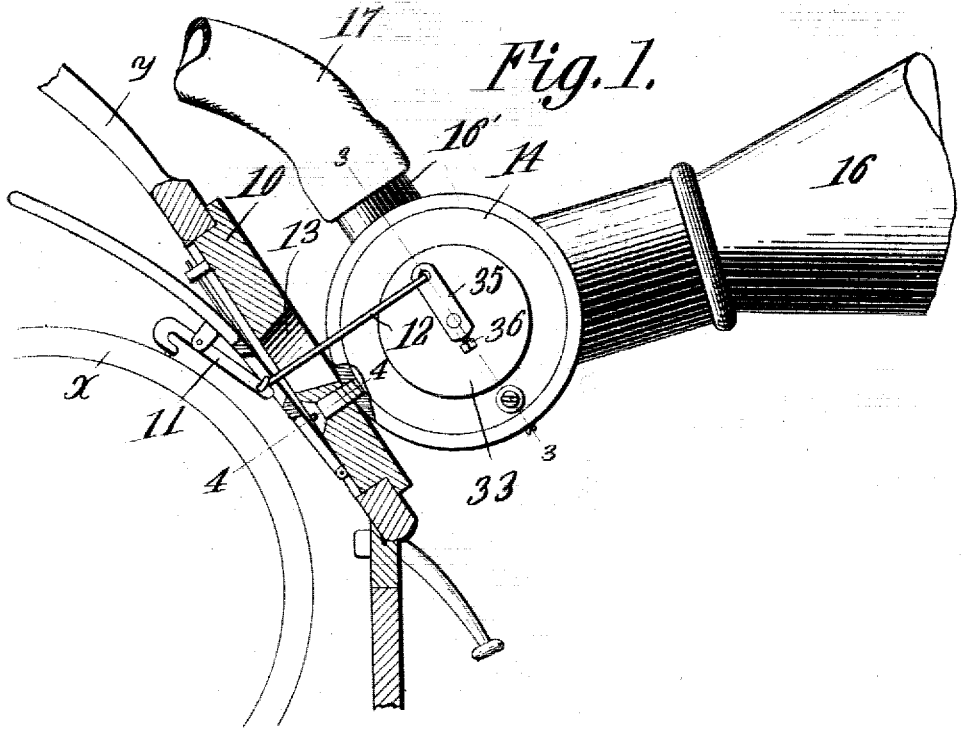
Figure 2:
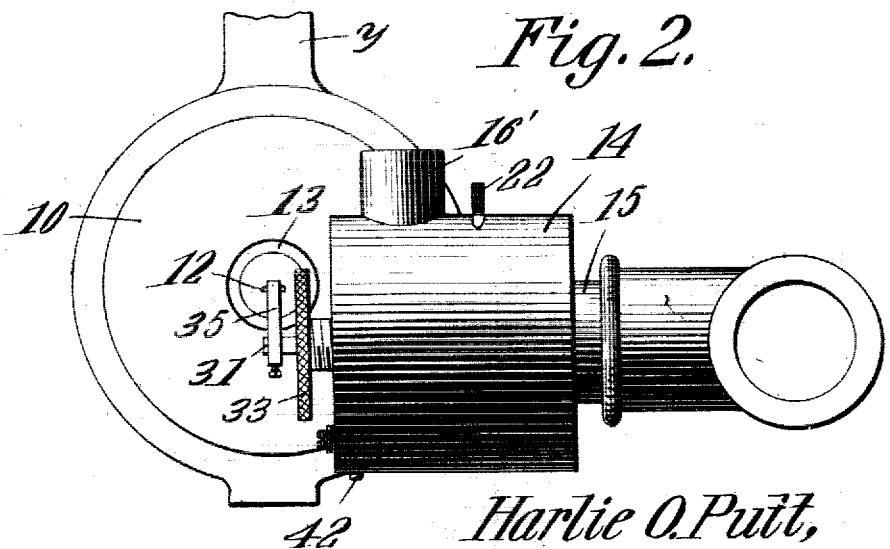

In the accompanying drawings:—Figure 1 is an elevation, partly in section, of a sound reproducing and magnifying apparatus constructed in accordance with the invention, showing the application of the same to a cylindrical record sound reproducing machine. Fig. 2 is a front elevation of the same. Fig. 3 is a sectional elevation of the device on the line 3—3 of Fig. 1. Fig. 4 is an elevation of the device, partly in section on the line 4—4 of Fig. 1. Fig. 5 is a detail perspective view of the valve which is actuated by the reproducing stylus. Fig. 6 is a similar view of the valve seat. Fig. 7 is a view, partly in section, illustrating the application of the invention to a megaphone or trumpet.

Similar numerals of reference are employed to indicate corresponding parts throughout the several figures of the drawings.

In Fig. 1 is shown a portion of a record $x$ of a sound reproducing machine, and a portion of a sound box carriage $y$, the sound box and all of its parts being eliminated. To the sound box carriage is secured a disk 10, which serves to support a stylus 11 which may be of the usual construction, and mounted in the usual manner. One end of the stylus bears on the record, and the other end is connected by a link 12 to the apparatus for controlling the flow of the fluid under pressure, said link extending through a suitable opening 13 formed in the disk. Secured to the disk is a cylindrical casing 14 which is provided at one end with a short tube 15 for the reception of a trumpet 16 or other device by which the sound waves are to be carried off, and at one side of the casing is a nipple 16' which may be connected by a flexible tube 17 to a suitable source of supply of air, gas, or other fluid under pressure, this fluid entering the casing through the nipple 16', and passing outward through the connection 15, and this flow being governed by the sound record.

The interior of the casing is provided with an annular shoulder 19 on which is supported a valve seat 20, the latter being in the form of a disk that is provided with a large number of radial openings 21 that may be of any desired shape, the preferred form being that illustrated in Fig. 6, and extending from the periphery of this disk is a lever 22 that projects through a slot formed in the periphery of the casing in order to permit circumferential adjustment of said disk. At the center of the disk is an elongated hub 25 having a threaded opening for the reception of a bearing screw 26 having at one end a conical opening for the reception of a cone 27 projecting from one side of a valve disk 28, the latter being provided with radially extending arms of a shape similar to that of the openings 21 in the disk 20, and so arranged that in one position of the valve, all of the openings 21 will be entirely closed. Projecting from the opposite side of the valve disk 28 is a spindle 30 having a reduced end portion 31, and provided with a shoulder 32 against which bears the inner end of a manually adjustable screw 33 that is adapted to a threaded opening formed in the end of the cylindrical casing 14, this screw and the screw 26 forming bearings which may be very accurately adjusted for the purpose of bringing the two valve disks very closely together, without, however, bringing them into such frictional contact as might interfere with free movement of the disk 28. To the outer end of the reduced portion of the spindle 31 is secured a rocker arm 35 to which the link 12 is connected. The rocker arm is held in place by a set screw 36 which permits of circumferential adjustment of the rocker arms to suit the position of the apparatus. Projecting from the valve spindle 30 is a spring arm 38 which is engaged by a cam 39 carried at the inner end of a small shaft or arbor 40 which may be adjusted circumferentially in order to vary the stress exerted by the cam on the spring. The shaft is held in any position to which it may be adjusted by means of a small locking screw 42. This cam offers slight resistance to the movement of the valve 28 and keeps the reproducer stylus in intimate contact with the record.

In operation, the reproducer stylus will be vibrated as it comes into contact with the record, and this movement will be transmitted through the link 12 and rocker arm 35 to the valve spindle and valve 28, the latter being moved a distance proportioned to the depth of the groove in the record. The air under pressure supplied to the casing 14 through the connection 16 will then escape through the openings 21 in the valve disk 20, the quantity of air escaping and the duration or variation of flow being governed by the movement of the disk 28. The released fluid being under pressure, will impinge against the air under atmospheric pressure in that portion of the casing which is connected to the trumpet, and will set such air into vibration, producing sound waves which correspond in time and duration with those from which the record was originally formed, but of much greater amplitude or increased force, and thus will travel a greater distance, and will be clearer and more distinct than waves which are produced through vibrations of a mechanical element, such, for instance, as the ordinary diaphragm.

In applying the invention to megaphones, speaking trumpets, and other instruments of like character, the mechanism is arranged as shown in Fig. 7, the cylinder, valves, trumpet and other parts remaining substantially the same as previously described.

The cylindrical casing in this case is attached to a perforated disk 50 that is secured to a casing 51 in which is arranged a diaphragm 52 connected by a link 12 to the valved rocker arm. The casing 51 is provided with a mouth piece 52, and by speaking, singing, or otherwise producing sound waves at the mouth piece, the diaphragm is set into vibration, and these movements are transmitted to the valve, the latter controlling the release of the fluid under pressure and producing sound waves of increased intensity in the trumpet or other device employed for conserving or reflecting the sound waves.

I claim:—

1. The combination with the stylus of a sound reproducing machine, of a casing having an inlet and an outlet for a fluid under pressure, a stationary valve disk arranged within the casing and provided with radially arranged passages, a movable valve disk having radially disposed arms for closing said passages, a stem carrying the movable disk, means for connecting the stem to the stylus, and means for resisting movement of the stem by said stylus.

2. The combination with the stylus of a sound reproducing machine, of a casing having an inlet and an outlet, of a fluid under pressure, a ported stationary valve disk within the casing, a movable valve disk, a stem carrying the same, a pair of adjustable bearings for said stem, an adjustable rocker arm carried by the stem, means for connecting the rocker arm to the stylus, a spring arm extending from the stem, and an adjustable cam bearing against said spring arm.

3. The combination with the stylus of a sound reproducing machine, of a casing having an inlet and an outlet for a fluid under pressure, a circumferentially adjustable ported valve disk seated within the casing and provided with an internally threaded hub, a bearing screw mounted in said hub, a movable valve disk, a stem carrying the same and having at one end a conical bearing seated in the screw, the opposite end of said screw being reduced in diameter to form a shoulder, a second bearing screw resting against the shoulder, a rocker arm adjustably secured to the reduced end of the stem, a link connecting the rocker arm to the stylus, a spring arm projecting from the stem, a cam arranged to bear against said arm, an adjustable arbor, or shaft carrying said cam, and a set screw for locking said arbor or shaft in adjusted position.

In testimony that I claim the foregoing as my own, I have hereto affixed my signature in the presence of two witnesses:

HARLIE OGDEN PUTT.

Witnesses:
 DANIEL H. JAMES,
 FOREST E. WALKER.